United States Patent [19]

Stevens

[11] 3,802,950

[45] Apr. 9, 1974

[54] CELLULAR POLYURETHANE-BITUMEN-PLASTIC COMPOSITE

[75] Inventor: James K. Stevens, Brimfield, Mass.

[73] Assignee: Monsanto Company, St. Louis, Mo.

[22] Filed: June 28, 1972

[21] Appl. No.: 267,076

[52] U.S. Cl. .................. 161/160, 161/161, 161/236

[51] Int. Cl. .......................... B32b 3/26, B32b 11/00

[58] Field of Search .................... 161/161, 160, 236

[56] References Cited

UNITED STATES PATENTS

| | | | |
|---|---|---|---|
| 3,470,016 | 9/1969 | Biles et al. | 161/161 |
| 3,492,196 | 1/1970 | Moore et al. | 161/236 |
| 3,563,845 | 2/1971 | Stevens | 161/160 |

*Primary Examiner*—William J. Van Balen

*Attorney, Agent, or Firm*—Edward P. Grattan

[57] ABSTRACT

Improved integral, three-layered plastic, thermally insulating composites each having an impact resistant solid facing layer of a monovinyl aromatic compound alpha-electronegatively substituted ethene compound interpolymer system, a layer of cellular polyurethane, and an interlayer of bitumen positioned between these two layers. The resulting composites have improved impact resistance as respects the solid facing layer.

5 Claims, 9 Drawing Figures

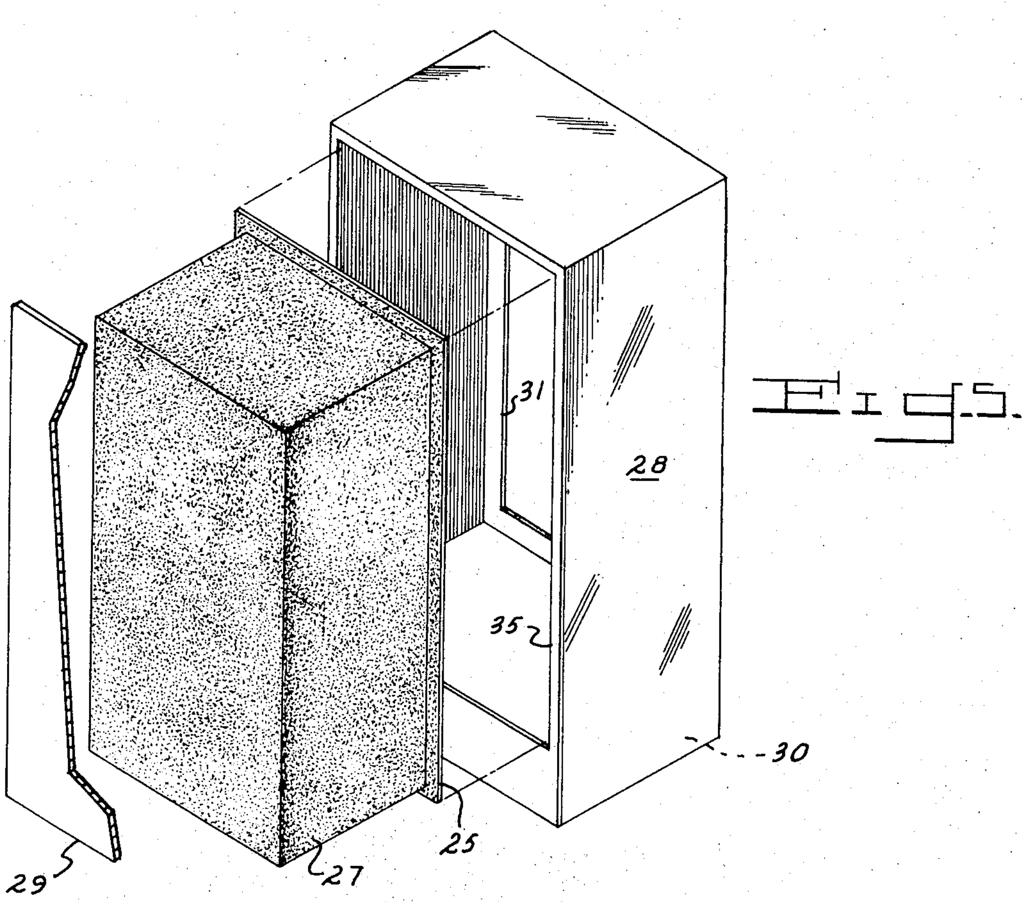
Fig. 5.
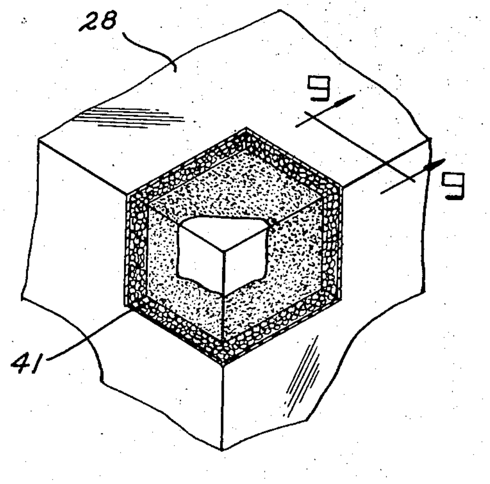
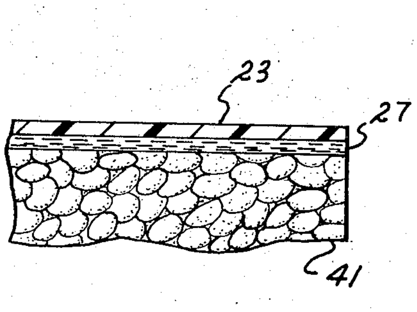
Fig. 9.
Fig. 8.

CELLULAR POLYURETHANE-BITUMEN-PLASTIC COMPOSITE

BACKGROUND

In the art of plastic composites, it has heretofore been conventional to bond a relatively thick layer of relatively rigid, thermally insulating (or acoustically insulating), cellular, plastic material to a relatively thin layer of solid impact resistant plastic sheeting especially sheeting comprising an interpolymer system of monovinyl aromatic compound and an alpha-electronegatively substituted ethene compound. Such composites are useful in many industrial and commercial applications, including construction materials, refrigerator cabinets, etc.

Such composites, however, suffer from a severe disadvantage in that the solid layer apparently can be more readily cracked when rigidly bonded to the cellular layer than in a free, unbonded form. Such cracks originate from exterior impacts generally localized in character. Actual crack propagation through, or in, such solid layer is a relatively low energy process while the actual point of crack initiation or formation is usually associated with a relatively high mechanical force. Apparently (though there is no intent to be bound by theory herein) the solid layer cracks more readily when bonded to the cellular layer because then the crack initiation site is in the brittle, more rigid cellular layer, and this site becomes a locus for easier initiation of cracks than when the solid layer is in a free, unbonded form. The rigidity of the cellular plastic seems to prevent or impair the shock absorbance normally associated with the free, unbonded solid layer.

Heretofore, it has been conventional to overcome such a degradation of impact resistance in solid plastic sheeting employed in such composites by using thicker or tougher plastic sheeting materials. However, such a procedure is disadvantageous since it not only can add appreciably to the cost of a resulting composite, but also it can add undesirable weight to such resulting composite and present subsequent application problems.

It has now been discovered, however, that when in such a composite one uses as the solid layer an interpolymer system of monovinyl aromatic compound and an alpha-electronegatively substituted ethene compound, and positions between such solid layer and such cellular layer an interlayer of bitumen, the toughness or impact resistance of the solid layer is surprisingly and unexpectedly improved. This improvement in impact resistance is achieved without adversely affecting the desired good adhesion characteristics between layers, and, at the same time, does not adversely affect the good structural rigidity characteristics desired in such composites. In addition, the combined thickness of solid layer and interlayer can be thinner than the thickness of a single thick layer of solid layer used alone and still achieve a product composite having unexpectedly good impact resistance in the solid facing layer.

Such new three-layer systems find value in a number of industrial and commercial applications; for example, they are useful as building or container construction materials. When used for instance in the production of refrigerator food liners (that is, a refrigerator cabinet and its door), the resulting liners characteristically display superior shelf-loading capacity and resistance to bulging or oil canning.

SUMMARY

This invention relates to thermally or acoustically insulating panel-like composites. Each such composite comprises three layers of material.

A first layer is composed of a cellular polyurethane material having spaced, generally parallel faces, and having a transverse thickness of at least about 0.5 cm (preferably from about 1 to 20 cm). The cellular material is characterized by having a foam density greater than about 0.008 gms/$cm^3$ at 23°C. (preferably from about 0.015 to 0.06 gms/$cm^3$ at 23°C.) when individual cells are substantially all gas filled, and by having a foam compressive modulus greater than about 5 kg/$cm^2$ at 23°C. (preferably from about 20 to 200 kg/$cm^2$ at 23°C.). Preferably such cellular material is substantially closed-celled.

A second layer is composed of bitumen and has a transverse thickness of from about 0.03 to 2.5 mm (preferably from about 0.05 to 0.2 mm). The bitumen used is so chosen that when it is in a layered form as indicated, it is characterized by having a softening point in the range of from about 80° to 250°F. as measured using ASTM Test No. D-36-64-T (ring and ball method) and by having a penetration value in the range of from about 50 mm/10 to 350 mm/10 as measured at 77°F. using ASTM Test No. D-5-65.

A third layer is composed of an organic, rigid, polymeric solid having spaced, generally parallel faces, and having a transverse thickness of from about 0.25 to 25 mm (preferably from about 0.75 to 3 mm). The solid comprises an interpolymer system of monovinyl aromatic compound and alpha-electronegatively substituted ethene compound, which, when in the layered form as indicated, is characterized by having an apparent tensile modulus of elasticity of from about 7,000 to 55,000 kg/$cm^2$ at 23°C. (preferably from about 10,000 to 40,000 kg/$cm^2$) by having a tensile elongation to fail of at least about 5 percent at 0°C. (preferably from about 7 to 30 percent at 0°C.) by having an independent impact strength greater than about 1 kg/m falling dart at 2.5 mm thickness and 23°C. (preferably from about 2 to 6 kg/m, same conditions).

The second layer is interposed between, and is generally contiguous with, the first and the third layers in composites of this invention. Also, adjacent faces of said first and said second layers, and adjacent faces of said second and said third layers, respectively, are continuously and directly bonded to one another.

For purposes of this invention, foam density, foam compressive modulus, apparent tensile modulus of elasticity, tensile elongation to fail, and the like, are each conveniently measured using ASTM Test Procedures or equivalent.

A suitable falling dart impact strength measurement test procedure is as follows:

A falling dart drop testing apparatus like that described in ASTM D-1709-59-T is used. The dart has a 1.5 inch diameter hemispherical head fitted with a 0.5 inch diameter steel shaft 8 inches long to accommodate removable weights. A pneumatic dart release mechanism is positioned so that the dart is dropped 26 inches onto the surface of the test specimen. The test specimen is clamped and held firmly between steel annular rings with an inside diameter of 5 inches. The clamping mechanism is aligned so that the dart strikes the center of the test specimen. The test specimens are preferably 6 inch by 6 inch flat plastic sheets. Specimen thicknesses should not deviate more than 5 percent from the nominal or average thickness.

In a test, the specimen is placed in the clamping mechanism, and the dart is loaded with the weight at which 50 percent failure is expected. Then, the test specimen is impacted with the dart and examined for cracks (failure is designated by any crack in the specimen). A new specimen is used for each impact. In the event that the specimen fails (or does not fail), one decreases (or increases) the weight in increments of 0.25 pounds until the procedure produces a failure-non-failure (or non-failure-failure) sequence. The results are recorded and the test is preferably continued until at least 15 specimens have been thus tested.

The calculation procedure is as follows:

A. record the number of impacts tested after the failure-non-failure (or non-failure-failure) point is reached (N), B. add together the dart weights for the N impacts (W), C. divide W by N ($W_{50}$), D. multiply $W_{50}$ by the drop height (26 inches) to obtain the 50 percent fail falling dart impact ($F_{50}$).

To determine falling dart impact for composites, the following modified procedure may be used: The same dart drop testing apparatus as above is used, except that the dart has a 1-inch diameter hemispherical head and the test specimen is not clamped, but is placed on a flat, hard surface. Test specimens are preferably 4 inch by 4 inch flat composites. The procedure and calculations are described as above.

In this invention, the term "Cellular polyurethane" has reference to a polyurethane the apparent density of which is decreased substantially by the presence of numerous cells disposed in a generally uniform manner throughout its mass. These cells are preferably discrete in this invention, and the gas phase of each cell is preferably independent of that of the other cells in a given cellular polyurethane layer. For purposes of this invention, a cellular polyurethane may have its individual discrete cells filled with a material other than air, for example, a fluorinated hydrocarbon, such as trichlorofluoromethane, or the like. The density of a cellular polyurethane employed in the present invention is conveniently measured at about 23°C. when individual discrete cells are substantially all gas filled.

COMPONENT MATERIALS

In general, any cellular polyurethane having the above-described characteristics can be used as the first layer in preparing the composites of this invention, as indicated above, provided the physical characteristics of the first layer are as indicated above. Such materials are well known to those of ordinary skill in the art of plastics.

Similarly, and in general, any bitumen having the above-described characteristics can be used as a second layer in preparing a composite of this invention.

The term "bitumen" is used herein in a broad generic sense to include the various natural and synthetic asphalts, tars, and pitches. For instance, various natural asphalts may be used such as natural Trinidad, Bermudea, gilsonite, grahamite, and Cuban, etc. Various petroleum asphalts may be used such as those obtained from California crudes. Smackover Arkansas crudes, Mid-Continental air-blown oils, Mexican petroleum asphalts, as well as tarry residues known as cracked asphalts obtained as a by-product during the cracking of gas oil or other heavier petroleum fractions to obtain gasoline or other lighter fractions, etc. Still further bituminous materials may be used such as coal tar, wood tar, petroleum pitches, and pitches obtained from various industrial processes such as a fatty acid pitch, etc.

The bitumen of the present invention may have been subjected to any of the commonly used refining or treating processes, such as distillation, steam reduction, air-blowing, air-blowing with catalyst, solvent extraction, etc. The invention may also be applied to the use of asphalt or other bituminous materials in a cutback condition, i.e., dissolved in a volatile solvent such as kerosene, toluene, petroleum aromatic solvent fraction, benzene. However, since it is a primary advantage of the present invention that cutback solvents are not necessary, seldom will cutback asphalts be used.

The useful bitumens are described in the book, *The Properties of Asphaltic Bitumen* by J. Ph. Pfeiffer, particularly as defined on pages 4–7. Also, the useful bitumens of this invention are described in the book, *Asphalts and Allied Products*, fifth edition, by Herbert Abraham. A class of tars may be used such as those defined in U.S. Pat. No. 2,921,919. A particularly useful class of asphalts are the petroleum asphalts, either as a soft, petroleum residuum or as a hard, petroleum residuum which may be further processed by air-blowing, catalytic air-blowing, and solvent extraction, e.g., propane extraction, of still residues.

Another description of bitumens which are useful in the practice of this invention may be found in "Science of Petroleum," volume 4, pages 2690–2759.

Similarly, in general, any rigid solid plastic having the characteristics above described can be used as a third layer in the composites of this invention, as indicated above. As used herein, the terminology "an interpolymer system of monovinyl aromatic compound and alpha-electronegatively substituted ethenes" has reference to:

A. interpolymers formed by polymerizing a monovinyl aromatic compound with an alpha-electronegatively substituted ethene, B. interpolymers formed by polymerizing a monovinyl aromatic compound, an alpha-electronegatively substituted ethene, and a conjugated alkadiene monomer, C. mechanical blends of such interpolymers (A) and/or (B) with a preformed saturated or unsaturated rubber (such rubbers being as just above described), one presently preferred such rubber being one derived from a conjugated alkadiene monomer which is either homopolymerized or copolymerized with another component, especially a monovinyl aromatic compound or an alphaelectronegatively substituted ethene, or both, D. graft copolymer blends of such interpolymers (A) and/or (B) produced by polymerizing the monomers used to make such interpolymers in the presence of a preformed saturated or unsaturated rubber (as characterized above).

E. mixtures of (A), (B), (C) and/or (D).

In general, such an interpolymer system has a number average molecular weight ($M_n$) ranging from about 20,000 through 120,000 and the ratio of weight average molecular weight ($M_w$) to number average molecular weight $M_w/M_n$ ranges from about 2 through 10.

Suitable rubbers for use in such an interpolymer system include unsaturated rubbers like polybutadiene, styrene/butadiene, copolymers, ethylene/propylene copolymers, neoprene, butyl rubbers, and the like, and unsaturated rubbers like polyurethane silicone rubbers, acrylic rubbers, halogenated olefins, and the like. In general, rubbers used in the starting materials employed to make products of this invention have a glass phase or second order transition temperature below about 0°C. (preferably below about −25°C.) as determined by ASTM Test D-746-52-T, and have a Youngs Modulus of less than about 40,000 psi.

A preferred class of rubbers for use in such an interpolymer system are diene polymer rubbers. Examples of diene polymer rubbers include, for example, natural rubber having isoprene linkages, polyisoprene, polybutadiene (preferably one produced using a lithium alkyl or Ziegler catalyst), styrenebutadiene copolymer rubber, butadiene acrylonitrile copolymer rubber, mixtures thereof and the like. Such rubbers include homopolymers and interpolymers of conjugated 1,3-dienes with up to an equal amount by weight of one or more copolymerizable mono-ethylenically unsaturated monomers, such as monovinylidene aromatic hydrocarbons (e.g., styrene; an aralkylstyrene, such as the o-, m-, and p-methylstyrenes, 2,4-dimethylstyrene, the ethylstyrenes, p-tert-butylstyrene, etc.; and alpha-alkylstyrene, such as alpha-methylstyrene, alpha-ethylene, alphamethyl-p-methylstyrene, etc.; vinyl naphthalene, etc.); arhalo monovinylidene aromatic hydrocarbons (i.e. the o-, m-, and p-chlorostyrenes, 2,4-dibromostyrene, 2-methyl-4-chlorostyrene, etc.); acrylonitrile, methacrylonitrile; alkyl acrylates (e.g. methyl acrylate, butyl acrylate, 2-ethylhexyl acrylate, etc.); the corresponding alkyl methacrylates, acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines, vinyl esters (e.g., vinyl acetate, vinyl stearate, etc.); vinyl and vinylidene halides (e.g. the vinyl and vinylidene chlorides and bromides, etc.); and the like.

A more preferred group of diene polymer rubbers are those consisting essentially of 75.0 to 100.0 percent by weight of butadiene and/or isoprene and up to 25.0 percent by weight of a monomer selected from the group consisting of monovinylidene aromatic hydrodcarbons (e.g., styrene) and unsaturated nitriles (e.g., acrylonitrile), or mixtures thereof. Particularly advantageous substrates are butadiene homopolymer or an interpolymer of 90.0 to 95.0 percent by weight butadiene and 5.0 to 10.0 percent by weight of acrylonitrile or styrene.

Another preferred class of rubbers for use in such an interpolymer system are acrylic rubbers. Typically, such a rubber is formed from a polymerizable monomer mixture containing at least 40 weight percent of at least one acrylic monomer of the formula:

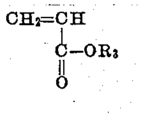

where $R_3$ is a radical of the formula:

$(C_pH_{2p+l})$ and $p$ is a positive whole number of from 4 through 12.

Although the rubber may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

Optionally, such an interpolymer system may have chemically incorporated thereinto (as through polymerization) a small quantity, say, less than about 2 weight percent based on total interpolymer system weight of a crosslinking agent such as a divinyl aromatic compound, such as divinyl benzene, or the like. Also optionally, such an interpolymer system may have chemically incorporated thereinto (as through polymerization) a small quantity, say, less than about 2 weight percent based on total interpolymer system, of a chain transfer agent, such as an unsaturated terpene, like terpinolene, an aliphatic mercaptan, a halogenated hydrocarbon, or the like. Such interpolymer systems and methods for their preparation are known to the prior art and do not constitute as such a part of the present invention.

Suitable monovinyl aromatic compounds for use in such interpolymer systems include styrene (preferred); alkyl-substituted styrenes, such as ortho-, meta-, and para-methyl styrenes, 2-4-dimethylstyrene, para-ethylstyrene, or alpha-methyl styrene; halogen substituted styrenes, such as ortho-, meta-, and para-chlorostyrenes, or bromostyrenes, 2,4-dichlorostyrene; and mixed halogen plus alkyl-substituted styrenes, such as 2-methyl-4-chlorostyrene; vinyl naphthalene; vinyl anthracene; mixtures thereof and the like. The alkyl substituents generally have less than five carbon atoms, and may include isopropyl and isobutyl groups.

Suitable alpha-electronegatively substituted ethenes for use in such interpolymer systems include those represented by the generic formula:

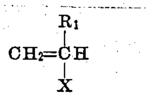

where X is selected from the group consisting of —CN, $—COOR_2$, and $—CONHR_2$, $R_1$ is selected from the group consisting of hydrogen-, $—(C_nH_{2n+1})$, $—(C_nH_{2n})—CN$, and $—(C_nH_{2n})—COOR_2$, $R_2$ is selected from the group consisting of hydrogen, and $—(C_mH_{2m+1})$, $n$ is an integer of from 1 through 4, and $m$ is an integer of from 1 through 8.

Suitable ethene nitrile compounds of formula (1) include acrylonitrile (preferred), methacrylonitrile, ethacrylonitrile, 2,4-dicyanobutene-1, mixtures thereof, and the like.

Suitable acrylic compounds of formula (1) include unsaturated acids, such as acrylic acid and methacrylic acid; 2,4-dicarboxylic acid butene-1, unsaturated esters, such as alkyl acrylates (e.g., methyl acrylate, ethyl acrylate, butyl acrylate, octyl acrylate, etc.); and alkyl methacrylates (e.g. methyl methacrylate, ethyl methacrylate, butyl methacrylate, octyl methacrylate, etc.); unsaturated amides, such as acrylamide, methacrylamide, N-butyl acrylamide, etc.; and the like.

Suitable conjugated alkadiene monomers for use in such interpolymer systems include butadiene, 3-methyl-1,3-butadiene, 2-methyl-1,3-butadiene, piperylene chloroprene, mixtures thereof and the like. Conjugated 1,3-dienes are preferred.

In interpolymer systems of type (A) above, the amount of chemically combined monovinyl aromatic compound typically ranges from about 20 to 95 weight percent, and preferably from about 50 to 75 weight percent (based on total weight of such interpolymer), while, correspondingly, the amount of chemically combined alkene nitrile typically ranges from about 80 to 5 weight percent, and preferably from about 40 to 10 weight percent. Examples of such interpolymer systems include styrene/acrylonitrile copolymers, styrene/acrylate copolymers, and the like.

Examples of interpolymer systems of type (B) above include especially copolymers of styrene, acrylonitrile, and butadiene. In such interpolymers, the relative proportions of each of the monovinyl aromatic compound and the alkene nitrile remain as in interpolymer systems of type (A), while the amount of chemically combined conjugated alkadiene monomer typically ranges up to about 25 weight percent, and preferably from about 5 to 20 weight percent (based on total weight of such interpolymer).

These interpolymer systems of types (A) and (B) may, if desired, contain up to about 7 percent by weight of one or more other copolymerizable ethylenically unsaturated monomers, such as dialkyl maleates and fumarates (e.g., the dimethyl, diethyl, dibutyl, and dioctyl maleates, and fumarates, etc.); conjugated dienes (e.g., butadiene, isoprene, etc.); and the like. Also, if desired, the interpolymers can contain minor amounts, e.g., about 0.05 to 3 percent by weight of a chain transfer agent, such as a higher alkyl mercaptan, alphamethylstyrene dimer, terpinolene, and the like.

Among the preferred interpolymers are those which consist substantially of about 20 to 95 percent (preferably about 50 to 85 percent) by weight of a combined monovinyl aromatic hydrocarbon and about 80 to 5 percent (preferably about 50 to 15 percent) by weight of combined acrylonitrile, methacrylonitrile, methyl acrylate and/or methyl methacrylate, and mixtures thereof.

Any interpolymer systems of types (A) or (B) employed in addition to a graft copolymer superstrate (see interpolymer system type (B) usually has a specific viscosity of about 0.04 to 0.15, preferably about 0.07 to 0.1, measured as a solution of 0.1 percent of the polymer in dimethylformamide at 25°C.

In interpolymer systems of types (C) and (D), the total weight percentage of rubber present typically ranges up to about 25 weight percent, and preferably from about 5 to 20 weight percent (based on total weight of such a blend). Interpolymer systems of type (D) are preferred, and a particularly preferred such type is a graft copolymer of styrene and acrylonitrile, for example, on a butadiene based rubber. Other unsaturated or saturated rubbers, however, as described above can be employed in place of, or in addition to, such a diene type rubber.

In interpolymer systems of type (D), an interpolymer of type (B) forms the graft superstrate while the rubber forms the graft substrate. Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 30–100:100. With graft ratios above 30:100, a highly desirable degree of improvement in various properties generally is obtained.

The interpolymer systems of type (A) and (B) may be produced by various known polymerization techniques, such as mass, emulsion, suspension and combinations thereof. Whatever polymerization process is employed, the temperature, pressure and catalyst (if used) should be adjusted to control polymerization so as to obtain the desired product interpolymer. If so desired, one or more of the monomers may be added in increments during polymerization for the purposes of controlling viscosity and/or molecular weight and/or composition. Moreover, it may be desirable to incorporate low boiling organic, inert liquid diluents during a mass polymerization reaction to lower the viscosity, particularly when a rubber is employed. Moreover, the catalyst may be added in increments, or different catalysts may be added at the same time or at different points during the reaction. For example, when a combined mass-suspension process is employed, generally oil-soluble catalysts may be employed; and both low and high temperature catalysts may be advantageously used in some reactions.

The interpolymer systems of type (C) may be prepared by simple, conventional physical intermixing. Conveniently, one uses starting materials in a solid, particulate form, and employs such conventional equipment as a ribbon blender, a Henschel mixer, a Waring blender, or the like.

The interpolymer systems of type (D) may be prepared, for example, by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethene monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g., drum-drying, blending coagulating, etc. Preferably, they are prepared by simply comalaxating a mixture of the interpolymer and the hydroxylated graft copolymer at an elevated temperature for a period of time sufficient to provide an intimate fusion blend of the polymers. Blends of graft copolymer and interpolymer can be prepared by simply b/ending the two polymers together on conventional plastics working equipment, such as rubber mills, screw-extruders, etc.

As suggested above, interpolymer systems of monovinyl aromatic compound and alpha-electronegatively substituted ethenes most desirably employed in the present invention are those wherein at least a portion of such an interpolymer system has been so prepared in the presence of rubber as to cause some degree of chemical combination to occur between the rubber and remaining interpolymer system components. Typically, a small amount of the superstrate interpolymer is not in chemical combination with the rubber substrate because of the less-than-100 percent grafting efficiency of conventional graft copolymerization reactions.

It will be appreciated that any given third layer used in this invention generally comprises at least about 50 weight percent of an interpolymer system of monovinyl aromatic compound and alpha-electronegatively substituted ethenes with the balance up to 100 weight percent thereof being another polymer, such as a polyvinyl chloride, a polycarbonate, a polysulfone, a polyphenyleneoxide, a polyamide, or the like, provided, of course, the particular combination of polymers employed in a third layer has, when formed into such a given third layer, physical characteristics such as described above. Preferably, a third layer comprises at least 90 weight percent of such interpolymer system.

It will also be appreciated that any given first layer, second layer, or third layer can have incorporated thereinto minor amounts (say, up to about 15 weight percent total of any given such layer of conventional adjuvants, organic or inorganic fillers, flame retardants, plasticizers, antioxidants, stabilizers, and the like so as to enhance a given set of properties (physical, chemical, economic, or the like) in a particular product of the invention. For example, a first, second or third layer could have up to 10 percent plasticizer, up to 15 percent pigment, up to 5 percent stabilizer, and up to about 5 percent miscellaneous other additional additives, such as antioxidants, fillers, bactericides, fungicides, etc., all of those skilled in the art will appreciate.

METHODS OF FABRICATION

While conventional methods are used in making the composite products of this invention, it will be appreciated that some methods are presently more convenient and preferred.

Thus, one preferred method of fabrication commences with a preformed above-described third layer in sheet form such as is done by conventional plastic forming procedures as those skilled in the art appreciate. If a three-dimensional shaped configuration is desired in a particular composite product to be manufactured, then it is convenient to make such in the particular configuration desired, as by conventional vacuum forming, injection molding technology, or the like, all as those skilled in the art appreciate.

Next, one face of such sheet (for example, the outer face as when a refrigerator cabinet is being made) is coated with the above-described second layer. Such coating may be accomplished by any convenient, conventional procedure including spraying, dipping, brushing or the like. It is generally preferred to heat the bitumen to a temperature (e.g., about 200°–275°F. depending on the particular bitumen) where this material is rendered more readily applicable as a coating (by spraying or the like) on the third layer. Usually the heated bitumen is cooled rapidly on contact with the surface upon which it is coated. Sometimes also, it is convenient to add a solvent to the bitumen sufficient to fluidize it during coating, care being taken to use solvent which solvate slowly or not at all the first and third layers.

Next, the exposed face of the second layer is coated with the abovedescribed first layer using any convenient, conventional procedure which will produce a cellular polystyrene. The cellular polystyrene material comprising this third layer in this preferred method of fabrication is produced by positioning the two layered structure fabricated as just described in a mold chamber or equivalent and then depositing on such second layer within the mold chamber the chemicals which will generate in situ the desired cellular polyurethane layer, and allowing the first layer to form in the mold chamber. Afterwards, depending on the particular composite being formed, the mold chamber may be removed to separate the completed composite of this invention.

Observe that the above-preferred fabrication method requires no adhesive system(s) to bond together the second to the first layer and the third to the second layer. The forming procedure produces a product in which the individual contiguous layers are mutually interbonded.

Observe that in the foregoing discussion of methods of fabricating the first layer has been formed in situ by forming in place on the surface of the second layer the first layer. It will be appreciated, however, that certain types of cellular structures which comprise a first layer can be separately formed and then bonded by heat lamination procedures, solvent lamination procedures, and the like to the face of the third layer. Suitable cellular materials comprising a first layer which can be thus laminated to a second layer include generally cellular polyurethane.

Also observe that in the foregoing methods of fabrication, one commences with a preformed third layer as a starting point. Alternatively, one can start with a preformed first layer, coat such first layer with a second layer using coating procedures as described above, and then compress the third layer against the second layer, using heat and pressure, if desired, to bond the third layer to the first layer.

DESCRIPTION OF THE DRAWINGS

Composites of the present invention and a preferred method of construction thereof are more particularly illustrated in the attached drawings wherein:

FIG. 3 illustrates a first step in the manufacture of yet another embodiment of a composite of the present invention, this composite being suitable for use as a food liner in a refrigerator cabinet;

FIG. 8 illustrates the construction of the resulting refrigerator food liner showing a view of a corner thereof, some parts thereof broken away, and some parts thereof shown in section; and FIG. 9 shows a partial sectional view taken along the line 9-9 of FIG. 8.

Figure 1:
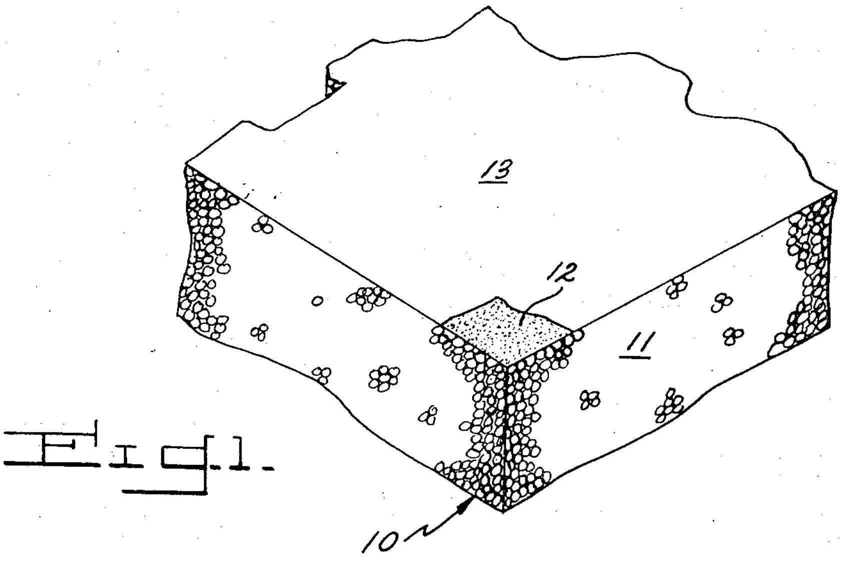
FIG. 1 is an isometric view of a corner region of one embodiment of a composite of this invention, some parts thereof broken away and some parts thereof shown in section.

Turning to these drawings, there is seen in FIG. 1 one embodiment of a composite structure of this invention designated in its entirety by the numeral 10. Composite 10 is seen to comprise a first layer 11, a second layer 12, and a third layer 13 integral with one another in face-to-face engagement. Layer 11 is composed of a cellular polyurethane; layer 12 is composed of a bitumen, and layer 13 is composed of a semi-rigid plastic such as acrylonitrile/butadiene/styrene, or the like. Individual thicknesses of these respective layers can range as described hereinabove.

Figure 2:
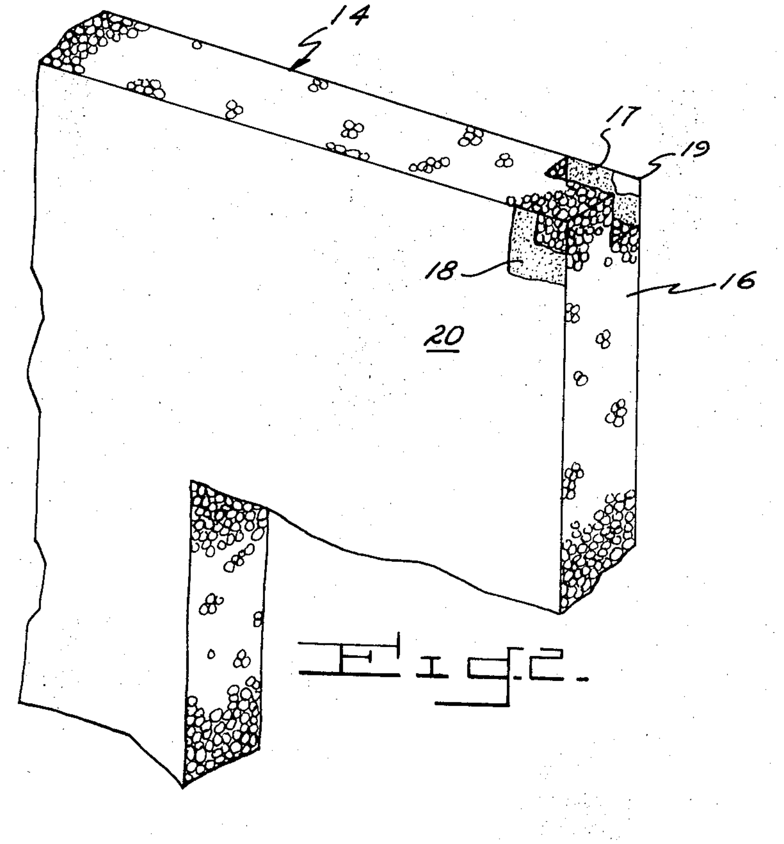
FIG. 2 is a view similar to FIG. 1 of another embodiment of a composite of this invention.
Figure 4:
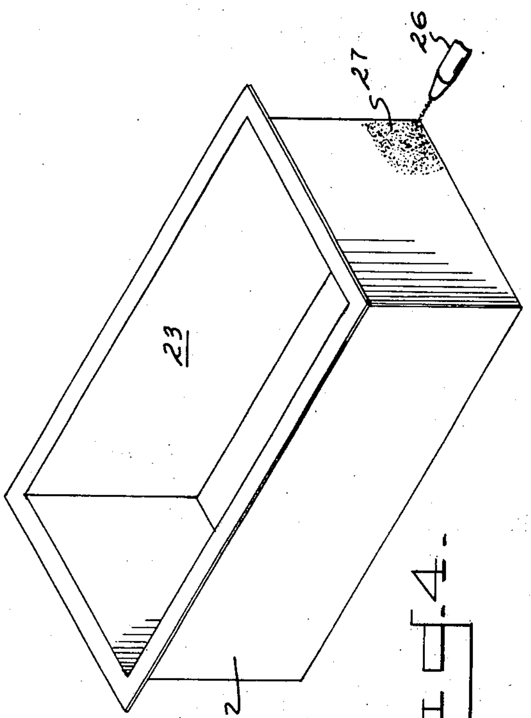
FIG. 4 illustrates a second step in such manufacture.

In FIG. 2 is seen another embodiment of a composite of this invention which is designated in its entirety by the numeral 14. Composite 14 is similar to composite 10 except that composite 14 has one first layer 16, two second layers 17 and 18, and two third layers 19 and 20. Composite 14 is conveniently made using a preformed first layer 16.

Both composite 10 and composite 14 are in sheet form, and each is usable in a number of ways, including use as the interior portion of a building wall in place of plasterboard or the like.

FIGS. 3–9 illustrate production of a refrigerator food liner incorporating a composite structure of this invention. Thus, in FIG. 3 is shown a third layer (such as a sheet of acrylonitrile/butadiene/styrene plastic or the like) which has been formed into the box-like configuration shown, for example, in a single operation by vacuum forming in a molding machine. This third layer comprises entire inside wall portions of a refrigerator cabinet, such third layer being herein designated in its entirety as wall member 23. This wall member 23 can have formed therein protrusions, depressions, or the like (all not shown) to facilitate or accomodate mounting of shelves, etc. therein the fully assembled, functional refrigerator, as those skilled in the art will appreciate.

The exterior surface regions 24 of third layer 23 (see FIG. 4) are hot spray coated as from the nozzle 26 of a spray gun (not shown) with a solution or dispersion containing a bitumen suitable for use as a second layer of a composite structure of this invention, thereby to deposit on exterior surface regions 24 a second layer 27. The liquid used as the carrier for such solution or dispersion evaporates to leave the bitumen which is adhered and bonded directly continuously to surface regions 24.

Figure 5:
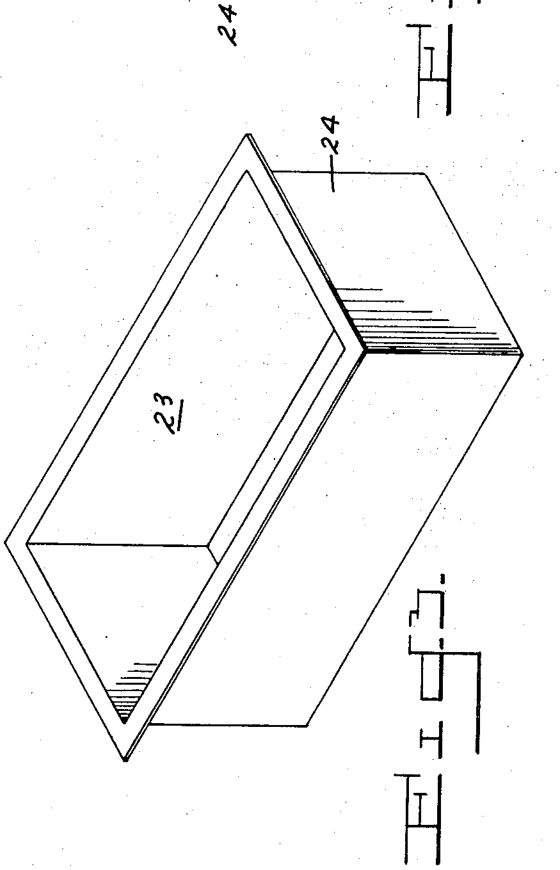
FIG. 5 illustrates a third step in such manufacture.

Next, the resulting double layered laminate construction comprising wall member 23 and second layer 27 is assembled with an exterior wall member 28 of a refrigerator cabinet (see FIG. 5). Exterior wall member 28 is conventionally preformed in a separate operation (not shown) and is conventionally composed either of sheet-metal (such as steel, or the like), or of plastic (such as the same plastic used in wall member 23. If the latter, then the inner surfaces of exterior wall member 28 can, if desired, be coated (not shown) with a second layer of this invention. Conveniently, exterior wall member 28 has a separate back wall panel 29. The double layered laminate construction comprising wall member 23 and second layer 27 is moved into exterior wall member 28 through the aperture formed when back wall panel 29 is removed, after which back wall panel 29 is secured to the adjoining portions of the remainder of exterior wall member 28 by any convenient means (not shown) such as screws, adhesives, etc. extending between panel 29 and inturned flanges 35 on exterior wall member 28, as those stilled in the art will appreciate. The front of exterior wall member 28 is adapted to have hinges (not shown) and a door latch (not shown) mounted thereon exteriorly so that a door (not shown) can be hung across the front regions of the assembly thereby to provide a complete refrigerator cabinet. Exterior wall member 28 is outfitted with a compartment or space 30 in its lower region to accommodate the refrigerator cooling mechanism (not shown) including compressor, coils, electric motor, and associated components.

Figure 7:
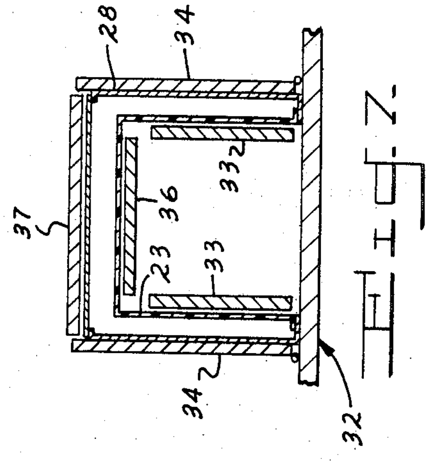
FIG. 7 illustrates still another step in such manufacture; IN SUCH MANUFACTURE.
Figure 6:
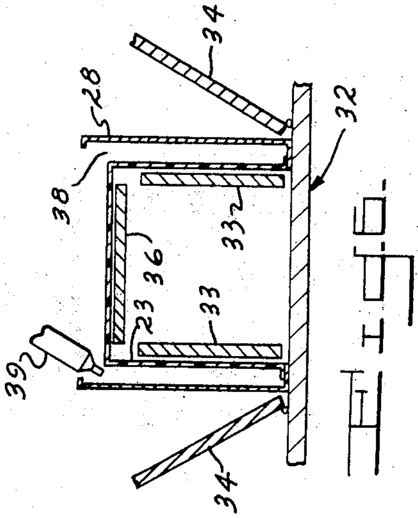
FIG. 6 illustrates another step in such manufacture.

The assembly of exterior wall member 28, and double layered laminate construction comprising wall member 23 as the third layer and second layer 27 is now positioned in a supporting frame assembly designated in its entirety by the numeral 32 (see FIGS. 6 and 7). Frame assembly 32 includes interior and exterior supporting side wall members 33 and 34, respectively, as well as interior and exterior supporting rear wall members 36 and 37, respectively, which cooperate together and function to brace, respectively, adjacent wall portions of wall member 23 and outside surface portions of exterior wall members 28. Suitable bracing and hinge means, generally not shown, are employed in frame assembly 32 to secure frame assembly 32 demountably against such surface portions. Such bracing is desirable (depending upon pressures developed) to support the assembly comprising wall members 23 and 28 and associated elements during in situ production of a first layer in the void space 38 now, existing between wall member 23 and wall member 28. To produce such a first layer, into this space 38 is injected, as through a nozzle 39, a liquid chemical composition which chemically interacts with itself to form a closed celled polyurethane foam, thereby creating a first layer 41 (see FIGS. 8 and 9) and completing formation of a composite structure of this invention. After first layer 41 is formed, the frame assembly 32 is removed and the new completed refrigerator food liner is used in the manufacture of a complete refrigerator. FIGS. 8 and 9 show details of such composite.

EMBODIMENTS

The following examples are set forth to illustrate more clearly the principles and practice of this invention to one skilled in the art and they are not intended to be restrictive but merely to be illustrative of the invention herein contained.

EXAMPLE 1

A sheet of acrylonitrile/butadiene/styrene plastic material termed ABS herein and available commercially under the trademark "Lustran" from Monsanto Company measuring approximately 1 ft. × 2 ft. × 60 mils is prepared by extrusion and cutting. Physical properties of the sheet are as described below in Table 1. The falling dart values are measured at 2.5 mm thickness and 23°C.

One face of such sheet is coated with bitumen at about 250°F. by using a brush as an applicator. The bitumen is as described in Table 1 below.

The resulting laminate is now placed in an aluminum mold whose void space measures approximately 1 ft. × 2 ft. × 1½ inches. This mold with the laminate therein is now heated to a temperature ranging from 100°–140°F. and a sufficient quantity of a mixed urethane foam precursor is injected into the mold void so as to produce in the mold void a foam layer having a foam density of about 2.5 pounds per ft. (see Table 1 below). As the foam expands and cures in the mold void, the foam bonds to the bitumen layer. Such foamed layer so formed also has an apparent compressive modulus greater than about 800 psi at 23°C. Such foam layer so formed in this example constitutes a first layer in a composite of this invention as this terminology is used herein.

There is thus formed a three layered composite of this invention. Such composite comprises a first layer of polyurethane foam, a second layer of bitumen, and a third layer of ABS. The completed composite is cut into 4 inches × 4 inches squares for impact testing. Each such product square undergoes a modified falling dart impact test on its third layer as follows:

A modified falling dart method is used, as follows: A dart with a 1 inch diameter nose is weighted and dropped onto the ABS sheet facing of the composite from a height of 3 feet. The amount of weight on the dart is adjusted (see above described procedure for measuring falling dart impact) to obtain the 50 percent fail point.

Each resulting such composite has a thickness of about 1½ inches and a falling dart impact strength (measured against the third layer) of 9 ft./lbs. at 0°F.

This composite as thus is a great improvement over the falling dart impact of 1.2 foot/lbs. obtained on a composite panel prepare in the same mold using the same ABS facing and the same urethane foam, but without the asphalt interlayer.

EXAMPLES 2–9

Additional composites of the invention are prepared as described below in Table 1.

Each product composite displays excellent impact resistance in its third layer.

EXAMPLE 10

Refrigerator Cabinet

The following example is described in references to FIGS. 3–9. In FIG. 3 is shown the inside refrigerator cabinet food liner wall member 23, which has been vacuum formed from a 0.250 inch thick extruded sheet of ABS plastic. The average wall thickness in the part is 0.090 inch. The food liner dimensions are 37½ inches × 20½ inches. Wall member 23 constitutes a third layer of a composite structure of this invention.

The exterior surface regions 24 of wall member 23 are brush coated with bitumen as described in Example 1 with the bitumen of Example 1 to produce the second layer 27 of a composite structure of this invention.

Next, the double layered construction comprising wall member 23 and layer 27 is assembled together with an exterior wall member 28 is supporting frame assembly 32. The exterior wall member 28 is preformed in a separate operation and is composed of 22 gauge mild steel. The exterior wall member 28 has an inturned flange 31 which is one inch wide, upon which the out-turned one inch flange 25 of the interior foodliner 23 is sealed. The space between the interior and exterior cabinets is about 1½ inches wide. The separate exterior back panel 29 seals against flange 35 on the exterior wall member 28.

The distance between the two walls is about 1½ inches and the calculated volume is about 2.9 cubic feet. Hot air (160°F.) from so-called D&W Hopper Dryer manufactured by so-called Thoreson-McCosh Company is blown into the air space between outer and inner cabinets for approximately 2 hours. This gives a pre-heat temperature of 130°–140°F. to the liner before foaming.

Urethane foam is metered and mixed using a laboratory scale so-called Admiral 100-b 2FSP two component machine. Foamer output is 9 pounds per minute. "Vultafoam 16-F-702" with a free rise density of 2.0 lbs./ft.$^3$ is used. Fifteen percent excess foam is used to insure filling. Thus, the in-place density was 2.3 lbs./ft.$^3$. The time needed to fill is 44 seconds.

During foaming, the foam is distributed down the sides and across the back of the food liner. The pour is programmed so that the sides and back receive approximately 11 seconds of pour time and the top and bottom receive approximately 5½ seconds.

After introduction of the foam, the back cabinet panel and back support panel are put into place and the support clamps latched. Rise and cure of the foam are allowed to proceed at room temperatures.

The resulting refrigerator food liner after removal from the supporting frame 37 constitutes a composite construction of this invention. The food liner can be conveniently used in the manufacture of a refrigerator cabinet.

The impact strength of the inner cabinet is 10 ft./lbs. measured against the third layer by falling dart impact.

This is a significant improvement over the 2 ft./lbs. recorded for a cabinet prepared in the same manner using the ABS facing and the same urethane foam but without the second layer of this invention.

LEGEND of Layer Chemical Compositions (the number being as designated in Table 1).

1. An acrylonitrile/butadiene/styrene plastic material available commercially under the trademark "Lustran 461" from Monsanto Company. This material is produced in sheet form by extrusion.

2. A Smackover asphalt which was obtained from crude oil from the Smackover Field, Arkansas which was processed by steam and vacuum distillation and which was blended with 90 parts by weight of such asphalt, 10 parts by weight of a liquid oily polypropylene to produce a composition having a softening point of about 218°F. (ASTM Test D-36-26) and a penetration of about 300 mm/10 (ASTM Test D-5-59T).

TABLE 1

| | THIRD LAYER | | | | | SECOND LAYER | | | | | FIRST LAYER | | | |
|---|---|---|---|---|---|---|---|---|---|---|---|---|---|---|
| Ex. No. | Type | Thick-ness (MM) | Tensile Modulus 23°C. (kg/cm²) | Tensile Fail Elong. 23°C.(%) | Indep. Falling Dart 23°C. (kg-M) | Type | Method of appli-cation | Soften-ing Point | Thick-ness (MM) | Pene-tration Value mm/10 | Type | Thick-ness (MM) | Den-sity | Com-press-ive Modulus 23°C. (kg/cm³) |
| 1 | (1) | 1.5 | 25,000 | 30 | 3.3 | (2) | spray | 218 | .05 | 300 | (3) | 3.8 | .04 | 70 |
| 2 | (1) | 2.5 | 25,000 | 30 | 5.5 | (2) | spray | 218 | .05 | 300 | (3) | 3.8 | .04 | 70 |
| 3 | (4) | 1.5 | 20,000 | 40 | 5.5 | (2) | spray | 218 | .05 | 300 | (3) | 3.8 | .04 | 70 |
| 4 | (1) | 1.5 | 25,000 | 30 | 3.3 | (5) | spray | 200 | .1 | 52 | (3) | 3.8 | .04 | 70 |
| 5 | (1) | 1.5 | 25,000 | 30 | 3.3 | (6) | spray | 175 | .1 | 75 | (3) | 3.8 | .04 | 70 |
| 6 | (1) | 1.5 | 25,000 | 30 | 3.3 | (2) | spray | 218 | .1 | 300 | (3) | 3.8 | .04 | 70 |
| 7 | (1) | 1.5 | 25,000 | 30 | 3.3 | (2) | spray | 218 | .05 | 300 | (7) | 3.8 | .055 | 105 |
| 8 | (1) | 1.5 | 25,000 | 30 | 3.3 | (2) | spray | 218 | .05 | 300 | (3) | 2.5 | .04 | 70 |
| 9 | (1) | 2.5 | 25,000 | 30 | 5.5 | (7) | spray | 114 | .1 | 90 | (3) | 3.8 | .04 | 70 |

3. A polyurethane foam available in the form of a foamable liquid system under the trademark "Vultafoam 16-F-702" from the General Latex and Chemical Corp. The foam formed from this material is a rigid thermoset closedcelled trichlorofluoromethane blown structure.

4. An acrylonitrile/butadine/styrene plastic material available commpercially under the trademark "Lustran 762" from Monsanto Company. This material is produced in sheet form by extrusion.

5. A Smackover asphalt (obtained from crude oil from the Smackover Field, Arkansas) having a penetration at 77°F. of 250–270 mm/10 (ASTM Test D-5-59T) which was air blown in the presence of 1.9 parts by weight of $T_2O_5$ per 100 parts by weight of asphalt to a softening point of 200°F. (ASTM Test D-36-26) and a penetration at 77°F. of 52 mm/10 (ASTM Test D-5-59T).

6. A Smackover bitumen (obtained from crude oil from the Smackover Field, Arkansas) which was reduced in a steam and vacuum distillation unit to a penetration at 77°F. of about 75 mm/10 (ASTM Test D-36-26) and a softening point of about 175° (ASTM Test D-5-59T).

7. A Smackover asphalt which was obtained from crude oil from the Smackover Field, Arkansas, and which was processed by steam and vacuum distillation to produce a product having a penetration of about 90 mm/10 ASTM Test D-5-59T and a softening point of about 114°F. (ASTM Test D-36-26).

What is claimed is:

1. A plastic, composite, thermally insulating, panel-like member, one face of which has impact resistance, said member comprising:

A. a first layer of a cellular polyurethane having spaced, generally parallel faces and having a transverse thickness of at least about 0.5 cm., said cellular polyurethane being characterized by:
   1. having a density of at least about 0.008 gm/cm³ at 23°C., when individual cells are substantially all gas filled, and
   2. having a compressive modulus greater than about 9 kg/cm² at 23°C., B. a second layer of a bitumen, said bitumen having spaced, generally parallel faces and having a transverse thickness of from about 0.03 to 2.5 mm, said bitumen being characterized by:
   1. having a softening point of from about 80° to 250°F., and
   2. having a penetration value of from about 50 to 350 mm/10 at 77°F., C. a third layer of semi-rigid, solid plastic having spaced generally parallel faces and having a transverse thickness of from about 0.25 to 25 mm., said rigid, solid plastic being characterized by:
   1. having a tensile modulus of elasticity of from about 7,000 to 55,000 kg/cm² at 23°C.,
   2. having a tensile elongation to fail of at least about 5 percent at 23°C.,
   3. having an independent impact strength greater than about 1 kg/cm falling dart at 2.5 mm thickness 23°C., and
   4. comprising an interpolymer system of monovinyl aromatic compound and electronegatively substituted acrylic compound, D. said second layer being interposed between, and generally contiguous with, said first and said third layers, and E. adjacent faces of said first and said second layers, and adjacent faces of said second and said third layers, respectively, being continuously directly bonded to one another.

2. The composite of claim 1 wherein said first layer is composed substantially of a closed-celled cellular polyurethane.

3. The composite of claim 2 wherein said first layer is composed substantially of an open celled cellular polyurethane.

4. The composite of claim 1 wherein said second layer comprises a bitumen which contains up to about 30 weight percent based on total bitumen composition weight of a liquid polyolefin.

5. The composite of claim 1 wherein said third layer is composed substantially of a graft copolymer blend of a monovinyl aromatic compound, an alpha-electronegatively substituted ethene, and a conjugated alkadiene.

* * * * *